(12) United States Patent
Jia et al.

(10) Patent No.: US 11,726,231 B2
(45) Date of Patent: Aug. 15, 2023

(54) HYPERGRAVITY EXPERIMENTAL APPARATUS AND EXPERIMENTAL METHOD FOR INTERACTION BETWEEN BRITTLE DEFORMATION AND DUCTILE DEFORMATION

(71) Applicant: NANJING UNIVERSITY, Nanjing (CN)

(72) Inventors: Dong Jia, Nanjing (CN); Xiaojun Wu, Nanjing (CN); Hanlin Chen, Nanjing (CN); Shufeng Yang, Nanjing (CN); Zhuxin Chen, Nanjing (CN); Hongwei Yin, Nanjing (CN); Yiquan Li, Nanjing (CN); Guoai Xie, Nanjing (CN); Yinqi Li, Nanjing (CN); Jianying Yuan, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 397 days.

(21) Appl. No.: 17/200,980

(22) Filed: Mar. 15, 2021

(65) Prior Publication Data
US 2021/0199845 A1    Jul. 1, 2021

(51) Int. Cl.
*G01V 99/00* (2009.01)
*G01N 3/16* (2006.01)
*G01N 3/12* (2006.01)

(52) U.S. Cl.
CPC ............ *G01V 99/005* (2013.01); *G01N 3/12* (2013.01); *G01N 3/165* (2013.01); *G01N 2203/0037* (2013.01); *G01N 2203/0048* (2013.01); *G01V 2210/6165* (2013.01); *G01V 2210/62* (2013.01); *G01V 2210/663* (2013.01)

(58) Field of Classification Search
CPC ......... G01V 99/005; G01V 2210/6165; G01V 2210/62; G01V 2210/663; G01N 3/165; G01N 2203/0037; G01N 2203/0048; G01N 3/12
See application file for complete search history.

(56) References Cited

U.S. PATENT DOCUMENTS

2005/0150273 A1* 7/2005 Potter ...................... G01N 3/10
73/38

FOREIGN PATENT DOCUMENTS

CN         106841028 A  *  6/2017  ............. G01N 19/00

* cited by examiner

*Primary Examiner* — Benjamin R Schmitt
(74) *Attorney, Agent, or Firm* — CBM Patent Consulting, LLC

(57) ABSTRACT

It discloses a hypergravity experimental apparatus and experimental method for interaction between brittle deformation and ductile deformation. The experimental apparatus comprises an experiment module, a control device and a drive device; the drive device comprises a centrifuge for generating a hypergravity environment and a hydraulic press for generating extensional/compressional force in an experiment box; the control device comprises a control terminal, a control cabinet and a hydraulic control station for controlling the operation of the drive device; the experiment module is provided with an experiment box and a transmission device therein, and the transmission device converts a vertical lifting force generated by a hydraulic cylinder controlled by the hydraulic press in the drive device into a horizontal pushing-pulling force.

12 Claims, 4 Drawing Sheets

HYPERGRAVITY EXPERIMENTAL APPARATUS AND EXPERIMENTAL METHOD FOR INTERACTION BETWEEN BRITTLE DEFORMATION AND DUCTILE DEFORMATION

This application claims priority to Chinese Patent Application Ser. No. CN202110074588.5 filed on 20 Jan. 2021.

TECHNICAL FIELD

The present invention relates to a geological experimental apparatus and experimental method, in particular to a hypergravity experimental apparatus and experimental method for interaction between brittle deformation and ductile deformation.

BACKGROUND

Structural physical modeling is a method capable of modeling and studying large-scale geologic structural deformation under laboratory conditions, and have wide applicability. The first recorded experiment for studying a geological process by physical modeling was completed about 200 years ago. Physical modeling experiments for geologic structures were developed from qualitative to quantitative after Hubbert proposed the theory of scaled similarity for a geological modeling process in 1937. In the 1980s, a lithospheric plate model was established to model a large-scale geological process, bringing about a further leap in physical modeling.

In physical modeling experiments in a hypergravity environment created by centrifuges, the centrifuges generating the hypergravity environment are generally divided into two types: large long-arm centrifuges and small drum centrifuges. Nowadays, most scholars use drum centrifuges for experiments, but the gravitational acceleration of the existing drum centrifuge experimental facilities for geologic structural modeling is usually 2000 g and the model size is within a few centimeters, so it is difficult to precisely model the geologic structure. Moreover, due to the narrow space of experiment modules, it is impossible to arrange additional active force applying parts and synchronous observation instruments in the experimental facilities as under normal gravity, and it is difficult to precisely control the deformation rate and record the whole deformation process synchronously. In order to overcome the shortcomings, Queen's University tried to use a large long-arm centrifuge to carry out a hypergravity structural physical modeling experiment. Noble & Dixon (2011) used a long-arm centrifuge to model a fold-and-thrust structure for the first time, and found substantial improvements in the fineness and similarity of the experimental results from the long-arm centrifuge. However, the maximum acceleration generated by the centrifuge used in the experiment is only 200 g, which cannot meet the needs of physical modeling experiments for continental geological processes at the lithosphere scale. Moreover, the large long-arm centrifuge is not suitable for popularization due to the complex structure and high cost.

At present, drum centrifuge experiment modules cannot meet the needs of structural physical modeling for the following reasons: (1) the size of experiment boxes for structural physical modeling is too small, the maximum size of experiment boxes in the world is less than 100 mm×50 mm, and experiment modules can bear 1 kg-2 kg; (2) the experiment boxes for structural physical modeling are not provided with power-driven equipment, so that the deformation rate cannot be accurately controlled; and (3) deformation experiments in which brittle materials and plastic materials are spread at the same time cannot be met. Rotating arm geotechnical centrifuges cannot meet the needs of structural physical modeling for the following reasons: (1) the maximum acceleration of the centrifuges is less than 600 g; and (2) power-driven devices in the experiment modules can only be controlled below 200 g, and power drive for physical modeling experiments of structural deformation in the experiment modules cannot be accurately controlled in a hypergravity environment above 200 g.

SUMMARY

Purposes of the present invention: one purpose of the present invention is to provide a hypergravity physical modeling device for modeling the interaction between brittle deformation and ductile deformation in a hypergravity environment up to 2500 g with real-time dynamic monitoring; and another purpose of the present invention is to provide an experimental method using a hypergravity experimental apparatus for interaction between brittle deformation and ductile deformation.

Technical solution: A hypergravity experimental apparatus for interaction between brittle deformation and ductile deformation of the present invention comprises an experiment module, a control device and a drive device;

wherein the experiment module is provided with an experiment box and a transmission device therein, wherein experimental materials are spread in the experiment box, and the transmission device comprises a hydraulic cylinder, a lifting device, a lifting slider, a lifting slide rail, a translation slider, a translation connecting plate and a translation slide rail, the hydraulic cylinder is connected to the lifting device and controls motion thereof, the lifting slider is fixed on the lifting device, the lifting slide rail is connected with the translation connecting plate, both ends of the translation connecting plate are connected with the translation slider, the experiment box is provided with a triangular push plate connected with the translation slider therein, and the transmission device converts the lifting motion into translation motion to push the triangular push plate, allowing the experimental materials to be compressed or extended;

the control device comprises a control terminal, a control cabinet and a hydraulic control station, wherein the control terminal and the control cabinet control the drive device and the hydraulic control station to work; and the drive device comprises a centrifuge and a hydraulic press.

Further, the centrifuge generates a hypergravity environment of 10-2500 g.

The hydraulic control station controls liquid supply pressure and liquid flow rate generated by the hydraulic press, and the hydraulic press controls the hydraulic cylinder through hydraulic pipelines to control the transmission device to work.

The hydraulic pressure in the hydraulic cylinder is 0-21 MPa, the horizontal driving force generated by the transmission device is 0-27000 N, the size of the experiment box with power drive is 400 mm in length and 400 mm in width; and the net size of the experimental space of the experiment box is 300 mm in length and 350 mm in width.

The control terminal and the control cabinet set and control any two values of pushing speed, pushing distance and pushing time of the triangular push plate; preferably, the accuracy of the control speed is up to 0.01 mm/s, which can accurately control the motion speed.

A liquid slip ring of the centrifuge is connected with the hydraulic control station and a hydraulic interface on the hydraulic cylinder in the experiment module respectively through the hydraulic pipelines.

Further, the control device further comprises a flowmeter and a pressure gauge to detect and feedback flow and pressure information to the control terminal in real time for real-time monitoring.

Further, a side plate of the experiment box is preferably a transparent window, through which deformation of the materials in the box can be clearly and directly observed.

The experiment module is a basket experiment module located at each end of a rotating arm of the centrifuge.

An experimental method using the hypergravity experimental apparatus for interaction between brittle deformation and ductile deformation comprises the following steps:

a) spreading the experimental materials in the experiment box in a normal gravity environment with the centrifuge in a static state, then placing the experiment box in the experiment module at one end of the rotating arm of the centrifuge, installing a counterweight in the experiment module at the other end of the rotating arm, and connecting relevant control lines and hydraulic pipelines properly, with the hydraulic pipelines on the side where the counterweight is installed unconnected;

b) turning on the centrifuge, the experimental control terminal, the experimental control cabinet, the hydraulic control station, the flowmeter and the pressure gauge, presetting the gravity value of the hypergravity environment required for the experiment directly through the control terminal and/or the control cabinet, and starting the centrifuge until the set gravity value is reached;

c) setting any two values of compressing or extending distance, speed and time through the experimental control terminal, and controlling the hydraulic pressure in the hydraulic cylinder through the hydraulic control station to control the motion of the lifting device;

d) recording hydraulic flow rate, hydraulic flow, hydraulic pressure and deformation data of the materials in the experiment box; and e) stopping the centrifuge after the deformation experiment, and taking the experiment box out for observation and further study.

Advantageous effects: compared with the prior art, the present invention has the following remarkable advantages: the hypergravity environment created by the centrifuge used in the experiment is up to 2500 g; the flowmeter and the pressure gauge measure flow and pressure values in real time to monitor the experiment; and the driving force and deformation rate can be accurately controlled by controlling the hydraulic pressure and liquid flow rate.

DETAILED DESCRIPTION

The technical solutions of the present invention will be further described with reference to the accompanying drawings.

Figure 1:
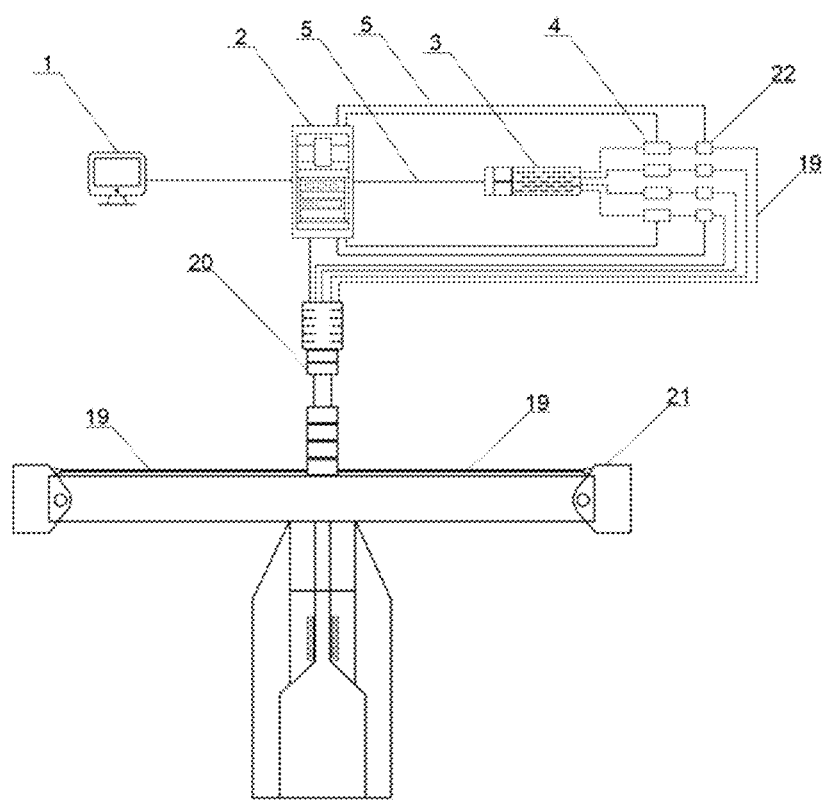
FIG. 1 is a structural diagram of the present invention.
Figure 2:
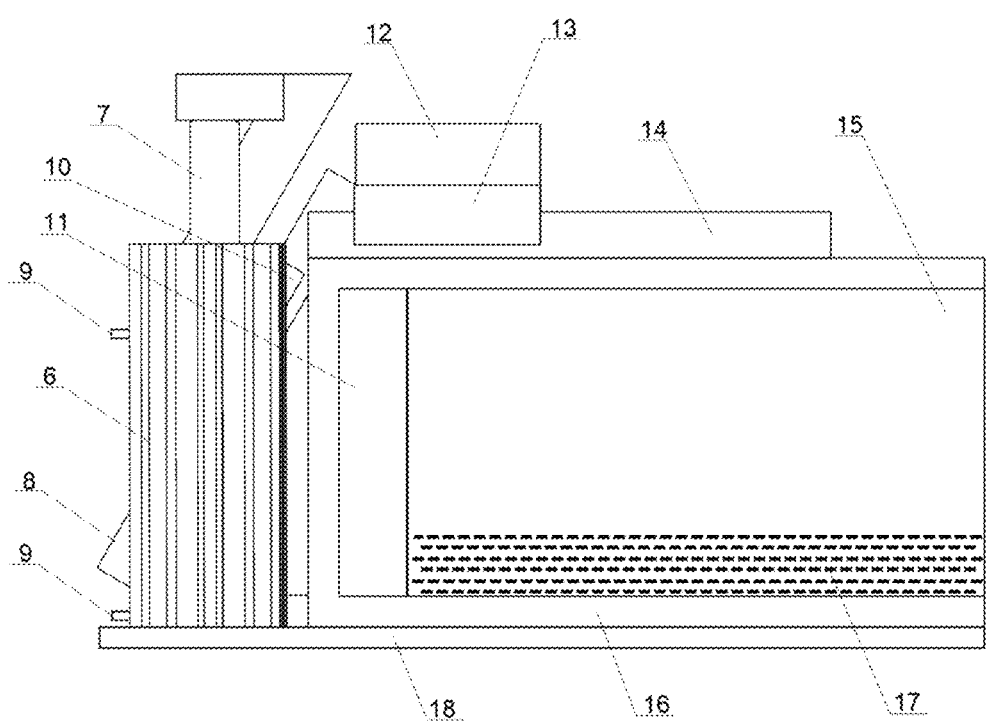
FIG. 2 is a front view of the experiment box.
Figure 3:
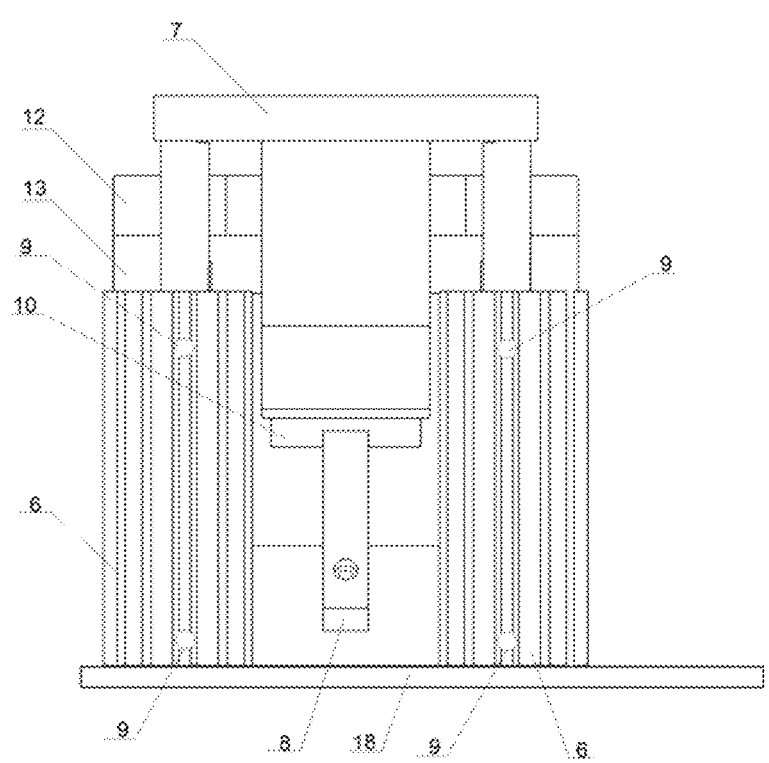
FIG. 3 is a left view of the experiment box.
Figure 4:
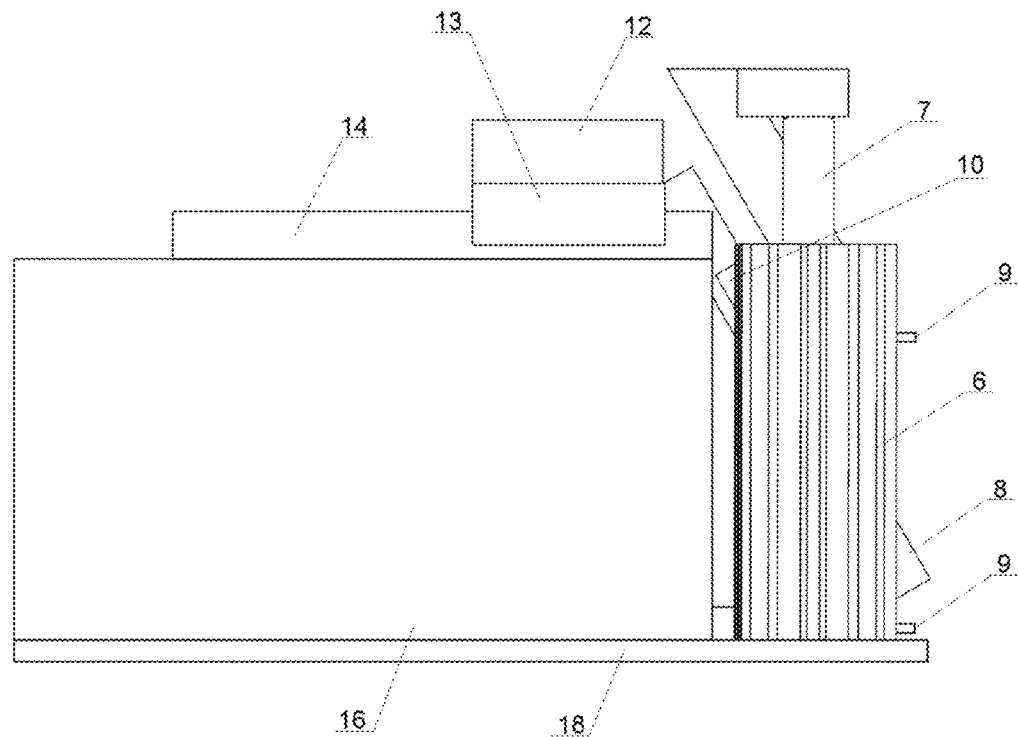
FIG. 4 is a rear view of the experiment box.
Figure 5:
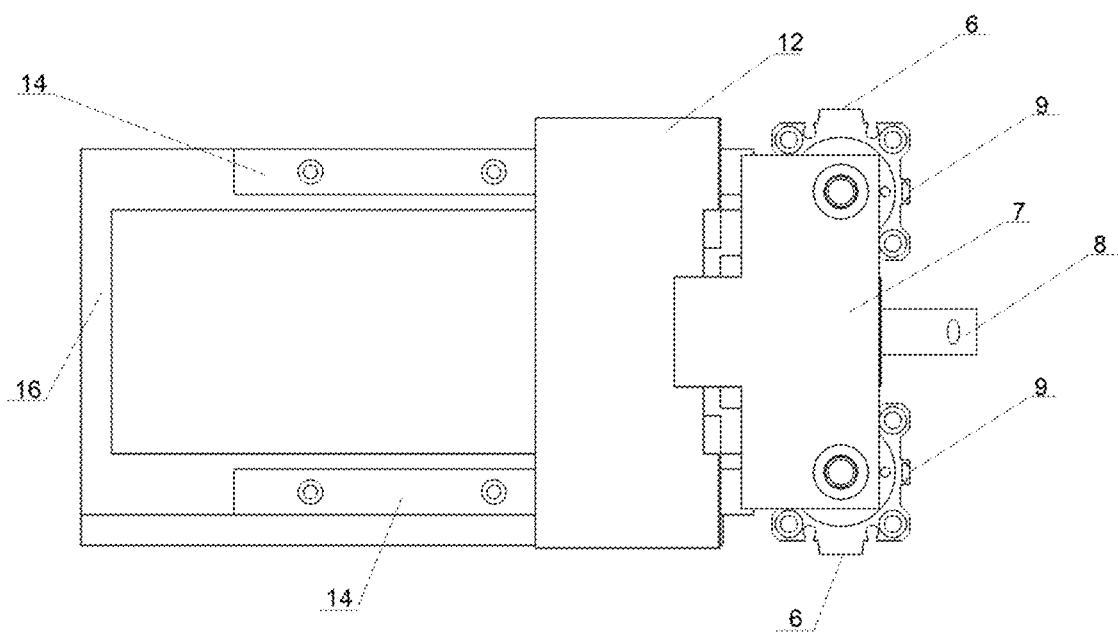
FIG. 5 is a top view of the experiment box.

As shown in FIG. 1, the present invention mainly comprises an experiment module 21, a control device and a drive device, wherein the size of an experiment box used in the experiment including the transmission device is 400 mm in length and 400 mm in width; and the net size of the experimental space of the experiment box is 300 mm in length and 350 mm in width.

The structure of the experimental apparatus and the experimental method can be further understood with reference to various views of the experiment box in FIG. 2 to FIG. 5.

The experiment module 21 is a basket experiment module located at each end of a rotating arm of a centrifuge, and provided with an experiment box and a transmission device therein, wherein experimental materials 17 are spread in the experiment box, and the transmission device comprises a hydraulic cylinder 6, a lifting device 7, a lifting slider 10, a lifting slide rail 8, a translation slider 13, a translation connecting plate 12 and a translation slide rail 14, the hydraulic cylinder 6 is connected to the lifting device 7, the lifting slider 10 is fixed on the lifting device 7, the hydraulic cylinder 6 controls the lifting device 7 to drive the lifting slider 10 to move up and down, and the lifting slider 10 generates a dragging force or pushing force on the lifting slide rail 8 while moving up and down. The lifting slide rail 8 is connected with the translation connecting plate 12, both ends of the translation connecting plate 12 are connected with the translation slider 13, the experiment box is provided with a triangular push plate 11 therein connected with the translation slider 13, the lifting device 7 also drives the translation connecting plate 12 and the translation slider to move horizontally in the translation slide rail 14 while driving the lifting slider 10 to move up and down and dragging or pushing-and-pulling the lifting slide rail 8, thus driving the triangular push plate 11 to compress or extend the experimental materials 17 in the experiment box. The body of the experiment box consists of a box frame 16 and a transparent window 15, and both the experiment box and the transmission device are installed on a base plate 18 of the experiment box.

The control device comprises a control terminal 1, a control cabinet 2 and a hydraulic control station 3. In the embodiment, the control terminal 1 is a computer installed with experiment box control software, and is connected with the control cabinet 2 in a wired or wireless manner. The gravity value of the hypergravity environment required for the experiment and the pushing distance, speed and time of the triangular push plate 11 are set through the experiment box control software. After the control terminal 1 or the control cabinet 2 transmits control information to the hydraulic control station 3 through control lines 5, the hydraulic control station 3 controls the hydraulic pressure, flow and flow rate, thus controlling the lifting speed, distance and time of the lifting slider 10 driven by the hydraulic cylinder 6 and the lifting device 7 in the experiment module. The transmission device converts lifting motion into translation motion, thus controlling the compressing or extending speed, distance and time for the experimental materials 17 by the triangular push plate 11. The control device further comprises a flowmeter 4 and a pressure gauge 22 to detect and feedback hydraulic flow and pressure in real time.

If the set distance is positive, that is, the structural physical modeling experiment to be completed is a compressional deformation experiment, the lifting device 7 in the experiment module 21 drives the lifting slider 10 down, pushing the lifting slide rail 8 to move inside the experiment box, thus pushing the translation connecting plate 12 connected with the lifting slide rail 8 for translational motion. The translation connecting plate 12 drives the translation slider 13, and the translation slider 13 drives the triangular push plate for translational motion, thereby compressing the experimental materials. If the set distance is negative, that is, the structural physical modeling experiment to be completed is an extensional deformation experiment, the lifting device 7 in the experiment module 21 drives the lifting slider 10 up, dragging the lifting slide rail 8 to move outside the experiment box, thus dragging the translation connecting plate 12 connected with the lifting slide rail 8 for translational motion. The translation connecting plate 12 drives the translation slider 13, and the translation slider 13 drives the triangular push plate 11 for translational motion, thereby extending the experimental materials.

The drive device comprises a centrifuge and a hydraulic press, wherein the control terminal 1 and the control cabinet 2 control the operation of the centrifuge, and transmit control information to the hydraulic control station 3. The control information includes pushing distance, pushing speed and pushing time of the triangular push plate 11 in the experiment box, and the control accuracy of the pushing speed is up to 0.01 mm/s, which is embodied in controlling the hydraulic press and adjusting hydraulic pressure and flow in the hydraulic control station 3. The control hydraulic pressure of the hydraulic press is transmitted to a liquid slip ring 20 of the centrifuge through the hydraulic pipelines 19, and then transmitted to the hydraulic cylinder through the hydraulic pipelines 19 on the rotating arm which are connected with the liquid slip ring 20 and the hydraulic interface 9 on the hydraulic cylinder 6.

An experimental method using the hypergravity experimental apparatus for interaction between brittle deformation and ductile deformation according to any of claims 1 to 9, comprising the following steps:

a) spreading the experimental materials 17 in the experiment box in a normal gravity environment with the centrifuge in a static state, then placing the experiment box in the experiment module 21 at one end of the rotating arm of the centrifuge, installing a counterweight in the experiment module at the other end of the rotating arm, and connecting relevant control lines 5 and hydraulic pipelines 19 properly, with the hydraulic pipelines 19 on the side where the counterweight is installed unconnected;

b) turning on the centrifuge, the experimental control terminal 1, the experimental control cabinet 2, the hydraulic control station 3, the flowmeter 4 and the pressure gauge 22, presetting the gravity value of the hypergravity environment required for the experiment directly through the control terminal 1 and/or the control cabinet 2, and starting the centrifuge until the set gravity value is reached;

c) setting any two values of compressing or extending distance, speed and time through the experimental control terminal 1, and controlling the hydraulic pressure in the hydraulic cylinder through the hydraulic control station 3 to control the motion of the lifting device 7;

d) recording hydraulic flow rate, hydraulic flow, hydraulic pressure and deformation data of the materials in the experiment box; and e) stopping the centrifuge after the deformation experiment, and taking the experiment box out for observation and further study.

During the experiment, the modeling experiment for interaction between brittle deformation and ductile deformation in the hypergravity environment can be implemented simply by setting the hypergravity value of the hypergravity environment and the pushing distance, pushing speed and pushing time of the triangular push plate 11 through the experiment box control software running on the control terminal computer, with convenient and simple operation and high controllable accuracy.

What is claimed is:

1. A hypergravity experimental apparatus for interaction between brittle deformation and ductile deformation, comprising an experiment module (21), a control device and a drive device;

wherein the experiment module (21) is a basket experiment module provided with an experiment box and a transmission device therein, wherein experimental materials (17) are spread in the experiment box, and the transmission device comprises a hydraulic cylinder (6), a lifting device (7), a lifting slider (10), a lifting slide rail (8), a translation slider (13), a translation connecting plate (12) and a translation slide rail (14), the hydraulic cylinder (6) is connected to the lifting device (7) and controls motion thereof, the lifting slider (10) is fixed on the lifting device (7), the lifting slide rail (8) is connected with the translation connecting plate (12), both ends of the translation connecting plate (12) are connected with the translation slider (13), the experiment box is provided with a triangular push plate (11) therein connected with the translation slider (13), and the transmission device converts the lifting motion into translation motion to push the triangular push plate (11), allowing the experimental materials (17) to be compressed or extended;

the control device comprises a control terminal (1), a control cabinet (2) and a hydraulic control station (3), wherein the control terminal (1) and the control cabinet (2) control the drive device and the hydraulic control station (3) to work; and the drive device comprises a centrifuge and a hydraulic press.

2. The hypergravity experimental apparatus for interaction between brittle deformation and ductile deformation according to claim 1, wherein the centrifuge generates a hypergravity environment of 10-2500 g.

3. The hypergravity experimental apparatus for interaction between brittle deformation and ductile deformation according to claim 1, wherein the hydraulic control station (3) controls liquid supply pressure and liquid flow rate generated by the hydraulic press, and the hydraulic press controls the hydraulic cylinder (6) through hydraulic pipelines (19) to control the transmission device to work.

4. The hypergravity experimental apparatus for interaction between brittle deformation and ductile deformation according to claim 3, wherein the hydraulic pressure in the hydraulic cylinder (6) is 0-21 MPa, and the horizontal driving force converted by the transmission device is 0-27000 N.

5. The hypergravity experimental apparatus for interaction between brittle deformation and ductile deformation according to claim 3, wherein the control terminal (1) and the control cabinet (2) set and control any two values of pushing speed, pushing distance and pushing time of the triangular push plate (11).

6. The hypergravity experimental apparatus for interaction between brittle deformation and ductile deformation according to claim 1, wherein the hydraulic pressure in the hydraulic cylinder (6) is 0-21 MPa, and the horizontal driving force converted by the transmission device is 0-27000 N.

7. The hypergravity experimental apparatus for interaction between brittle deformation and ductile deformation according to claim 1, wherein the control terminal (1) and the control cabinet (2) set and control any two values of pushing speed, pushing distance and pushing time of the triangular push plate (11).

8. The hypergravity experimental apparatus for interaction between brittle deformation and ductile deformation according to claim 1, wherein a liquid slip ring (20) of the centrifuge is connected with the hydraulic control station (3) and a hydraulic interface (9) on the hydraulic cylinder (6) in the experiment module (21) respectively through the hydraulic pipelines (19).

9. The hypergravity experimental apparatus for interaction between brittle deformation and ductile deformation according to claim 1, wherein the control device further comprises a flowmeter (4) and a pressure gauge (22).

10. The hypergravity experimental apparatus for interaction between brittle deformation and ductile deformation according to claim 1, wherein a side plate of the experiment box is a transparent window (15).

11. The hypergravity experimental apparatus for interaction between brittle deformation and ductile deformation according to claim 1, wherein the experiment module (21) is located at each end of a rotating arm of the centrifuge.

12. An experimental method using the hypergravity experimental apparatus for interaction between brittle deformation and ductile deformation according to claim 1, comprising the following steps:
   a) spreading the experimental materials (17) in the experiment box in a normal gravity environment with the centrifuge in a static state, then placing the experiment box in the experiment module (21) at one end of the rotating arm of the centrifuge, installing a counterweight at the other end of the experiment module at the other end of the rotating arm, and connecting relevant control lines (5) and hydraulic pipelines (19) properly, with the hydraulic pipelines (19) on the side where the counterweight is installed unconnected;
   b) turning on the centrifuge, the experimental control terminal (1), the experimental control cabinet (2), the hydraulic control station (3), the flowmeter (4) and the pressure gauge (22), presetting the gravity value of the hypergravity environment required for the experiment directly through the control terminal (1) and/or the control cabinet (2), and starting the centrifuge until the set gravity value is reached;
   c) setting any two values of compressing or extending distance, speed and time through the experimental control terminal (1), and controlling the hydraulic pressure in the hydraulic cylinder through the hydraulic control station (3) to control the motion of the lifting device (7);
   d) recording hydraulic flow rate, hydraulic flow, hydraulic pressure and deformation data of the materials in the experiment box; and
   e) stopping the centrifuge after the deformation experiment, and taking the experiment box out for observation and further study.

\* \* \* \* \*